US009583774B2

(12) United States Patent
Boegershausen et al.

(10) Patent No.: US 9,583,774 B2
(45) Date of Patent: Feb. 28, 2017

(54) METHOD FOR COLD STARTING A FUEL CELL SYSTEM AND FUEL CELL SYSTEM OF A MOTOR VEHICLE

(75) Inventors: Clemens Boegershausen, Aichwald (DE); Matthias Lederbogen, Blaubeuren (DE); Bernhard Vogel, Stuttgart (DE)

(73) Assignee: Daimler AG, Stuttgart (DE)

( * ) Notice: Subject to any disclaimer, the term of this patent is extended or adjusted under 35 U.S.C. 154(b) by 986 days.

(21) Appl. No.: 13/395,037

(22) PCT Filed: Jul. 30, 2010

(86) PCT No.: PCT/EP2010/004662
§ 371 (c)(1),
(2), (4) Date: Apr. 6, 2012

(87) PCT Pub. No.: WO2011/029499
PCT Pub. Date: Mar. 17, 2011

(65) Prior Publication Data
US 2012/0183814 A1    Jul. 19, 2012

(30) Foreign Application Priority Data

Sep. 10, 2009  (DE) .................. 10 2009 040 815
Oct. 17, 2009  (DE) .................. 10 2009 049 761

(51) Int. Cl.
*H01M 8/04223*  (2016.01)
*H01M 8/04089*  (2016.01)
*H01M 8/04*  (2016.01)

(52) U.S. Cl.
CPC .... *H01M 8/04268* (2013.01); *H01M 8/04089* (2013.01); *Y02E 60/50* (2013.01)

(58) Field of Classification Search
CPC ......... H01M 8/04268; H01M 8/04947; H01M 8/04723; Y02E 60/50
See application file for complete search history.

(56) References Cited

U.S. PATENT DOCUMENTS

| 7,833,669 | B2 | 11/2010 | Aso et al. | |
|---|---|---|---|---|
| 2006/0280977 | A1* | 12/2006 | Sakajo et al. | 429/23 |
| 2007/0029123 | A1* | 2/2007 | Hochgraf | 180/65.3 |

(Continued)

FOREIGN PATENT DOCUMENTS

| DE | 10 2006 026 238 A1 | 12/2006 |
|---|---|---|
| DE | 10 2007 033 429 A1 | 1/2009 |

(Continued)

OTHER PUBLICATIONS

English translation of Chinese Office Action dated Nov. 27, 2013 (four (4) pages).

(Continued)

*Primary Examiner* — Rena D Cronin
(74) *Attorney, Agent, or Firm* — Crowell & Moring LLP

(57) ABSTRACT

The operational availability of a motor vehicle with a fuel cell is increased by providing that a defined quantity of the output power of the fuel cell system is consumed by a power consumption component in the heating-up phase and/or in the warm-up phase and that the consumed quantity of the output power is converted into power loss by impressing a suitable current into at least one winding of an electric motor which is to be energized.

7 Claims, 2 Drawing Sheets

(56) References Cited

U.S. PATENT DOCUMENTS

| | | | |
|---|---|---|---|
| 2007/0243428 A1* | 10/2007 | Richards et al. | ............... 429/14 |
| 2007/0292724 A1* | 12/2007 | Gilchrist | ........... H01M 8/04268 |
| | | | 429/9 |
| 2009/0035628 A1 | 2/2009 | Morita et al. | |

FOREIGN PATENT DOCUMENTS

| | | |
|---|---|---|
| JP | 2003-109636 A | 4/2003 |
| JP | 2004-281219 A | 10/2004 |
| JP | 2005-302446 A | 10/2005 |
| JP | 2006-351325 A | 12/2006 |
| JP | 2007-317516 A | 12/2007 |
| JP | 2008-103228 A | 5/2008 |
| JP | 2009-99393 A | 5/2009 |
| WO | WO 2008/148445 A2 | 12/2008 |
| WO | WO 2009/010113 A1 | 1/2009 |

OTHER PUBLICATIONS

Japanese-language Office Action dated Apr. 24, 2013 (six (6) pages).
Corresponding International Search Report with English Translation dated Dec. 8, 2010 (ten (10) pages).
Form PCT/ISA/237 (seven (7) pages).

\* cited by examiner

| Prozedur | Phase | Beschreibung | Dauer |
|---|---|---|---|
| Kaltstartprozedur | Phase I Initialisierung | System Einschalten Medien Dosierung | 2,5 Sekunden |
| | Phase II Aufwärmphase | Aufheizung im stehenden Fahrzeug Energieumsatz in Leistungssenken und Leistungsverschwendungsfunktion | 3-30 Sekunden |
| | Phase III Warmfahrphase | Fahrfreigabe erfolgt, bei reduzierter Leistung, weiteres Aufheizen, bei Bedarf: Energieumsatz in Leistungssenken und Leistungsverschwendungsfunktion | einige Minuten Lastabh. |
| Trocknungsprozedur | Trocknungsphase | während Fahrt, Trocknen des Brennstoffzellenstapels | einige Minuten |

Fig. 1

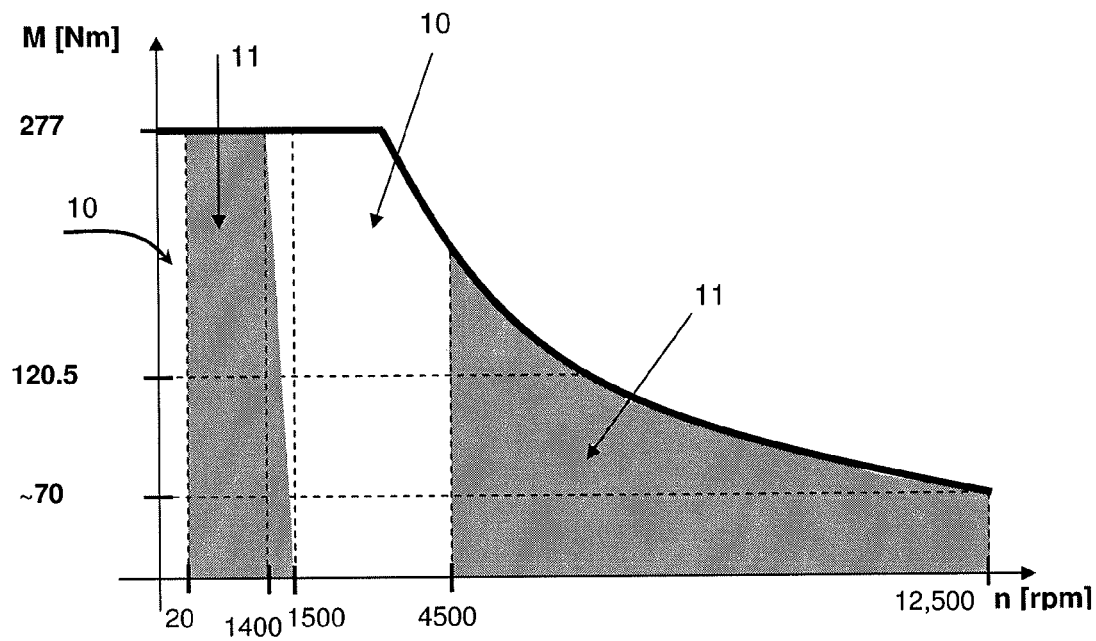

Fig. 2

METHOD FOR COLD STARTING A FUEL CELL SYSTEM AND FUEL CELL SYSTEM OF A MOTOR VEHICLE

BACKGROUND AND SUMMARY OF THE INVENTION

The invention relates to a method for cold-starting a fuel cell system of a motor vehicle, in particular at temperatures below freezing point, comprising at least one heating-up phase and a warm-up phase. The invention further relates to a fuel cell system of a motor vehicle.

Starting a cold fuel cell system below operating temperature, in particular at low temperatures below freezing point, poses a well-known problem in a fuel cell vehicle.

After operating the ignition, a fuel cell vehicle can only drive off if a control unit issues a drive enable signal. This drive enable signal can, however, be issued only after the fuel cell system has been heated to an adequate operating temperature.

In order to make a cold start as energy-efficient as possible, PCT International Publication No. WO 20081445 A2 discloses a fuel cell system with a cold start detection device and with a load that can be connected to the fuel cell stack. The control unit is designed such that the connected load can be varied with one or more load steps in response to the detection of the cold start state of the fuel cell stack. The load step may follow the drive enable signal in the dynamic operation of the vehicle, or it may precede the drive enable signal during a heating-up phase. This heating-up phase may, for example, have a duration of 120 seconds.

Unfortunately, the number of loads that can be connected to the fuel cell stack is limited, in particular in mobile applications such as a motor vehicle, and owing to operational limits the electric loads are not available without restriction as power sinks.

Exemplary embodiments of the present invention are direct to increasing the operational availability of the motor vehicle.

According to the invention, the operational availability is increased by consuming a defined quantity of an output power of the fuel cell system in the heating-up phase and/or in the warm-up phase using a power consumption means and by converting the consumed quantity of the output power into power loss by impressing a suitable current into at least one winding of an electric motor that is to be energized.

The output power of the fuel cell system is defined as the electric power of the fuel cell stack minus the power consumption of the electric secondary loads that are required for the operation of the fuel cell system and/or of the fuel cell vehicle. Electric secondary loads may for example be one or more auxiliary drive(s) of the fuel cell system, an HV auxiliary heater, possibly at least one low-voltage DC/DC converter, as well as a low-voltage electrical system and low-voltage loads such as cab air heaters or vehicle lighting.

Such a method therefore provides for a higher loading of the fuel cell system, which is desirable during a heating-up and/or warm-up phase, by selecting a component (power consumption means) already present in a fuel cell vehicle and by converting the impressed current into a further, likewise already existing, component (at least one phase winding of an electric motor). The execution of the method according to the invention advantageously results in a considerable reduction of the duration of the current operating phase in which the method is used, so that an operating phase following this operating phase can be initialized earlier. If the method according to the invention is used during the heating-up phase, the start of the following warm-up phase can be advanced considerably. As the drive enable signal is, on activation of the warm-up phase, issued by an algorithm of a control unit, the driver is able to drive off already, subject to some restrictions.

If, for example, the power demand of a traction motor falls below a defined value during a low-load or idling operation, this value being an indicator that a higher output power of the fuel cell system is available than the drive power which can be consumed by a traction motor, it is useful if the method according to the invention is used during the warm-up phase, in order to load the fuel cell stack as highly as possible. As a result, the warm-up phase can be terminated earlier, and the vehicle is fully operational at an earlier time.

The application of the method according to the invention, however, involves a reduction of energy efficiency, because the consumed quantity of the output power is converted into power loss. The consumed quantity of the output power that is converted into power loss therefore makes virtually no contribution to the effective power of the electric motor, but it significantly reduces the duration of the cold start or of the operating phase in which this method is used.

An inverter (DC/AC converter) can be used as a power consumption means because the inverter has several half-bridges that can be selected in such a way that the consumed quantity of the output power of the fuel cell system can be converted into power loss at one or more phase winding(s) of the electric motor.

In one embodiment of the invention, the drive enable signal is issued in the warm-up phase in dependence on the output power of the fuel cell system. In this way, an operating point for issuing the drive enable signal can be found advantageously as an agreement of the vehicle objectives, such as ruggedness, acceleration and service life of the fuel cell system. The drive enable signal is advantageously issued at an availability of less than 50% of the output power of the fuel cell system, in particular at an availability of 20% of the output power. Depending on the dimensioning of the vehicle, the warm-up phase can begin within less than 15 seconds after the heating-up phase when using the particularly preferred embodiment, in which the drive enable signal is issued at 20% of output power.

In an alternative embodiment of the method according to the invention, a drive enable signal is issued in the warm-up phase in dependence on the available total output power of a fuel cell stack and an energy storage device. The total output power results from the addition of the available power of the fuel cell stack and the available power of the energy storage device minus the power consumption of the electric secondary loads that are required for the operation of the fuel cell system and/or of the fuel cell stack. In this way, not only the capacity of the fuel cell stack, but also the capacity of the energy storage device is taken into account in a cold start in an advantageous way. Depending on the choice of energy storage device, this can be very limited at low temperatures. The drive enable signal is advantageously issued in the warm-up phase at an availability of less than 50% of total output power, in particular at an availability of 20% of total output power.

In a further development of the invention, the temperature in the cooling circuit of the fuel cell stack is increased and/or the input humidity of the supply gas for the fuel cell stack is reduced, preferably on the cathode side, in order to dry the fuel cell stack, in particular on completion of the cold start, for a subsequent start.

In a variant of the method according to the invention, the fuel cell stack and/or the energy storage device is/are during the heating-up phase and/or during the warm-up phase preferably periodically loaded with at least one electric load that is variable in terms of its power consumption, so that the fuel cell stack and/or the energy storage device output(s) a higher power in a first time interval than in a second time interval. Depending on the type of fuel cell and/or energy storage device, this may result in an earlier operational availability of the fuel cell stack and/or of the energy storage device.

Owing to an operating temperature that is lower than that of other fuel cell types, polymer electrolyte membrane fuel cells are preferably used as fuel cell type. The energy storage device is, for example, a lithium ion battery or a nickel metalhydride battery. Compared to other electrochemical energy storage devices, the lithium ion battery offers the advantage of a relatively high energy content. According to prior art, the nickel metalhydride battery offers the advantage of lower costs compared to the lithium ion battery.

In a particularly preferred embodiment, the power output of the fuel cell stack and/or of the battery is adjusted such that during the heating-up phase and/or the warm-up phase the fuel cell stack and/or the energy storage device output(s) a power of 0 kW in the second time interval. The temperature fluctuations resulting from the alternating currentless and current-output operation can advance the operational availability of the fuel cell stack and/or the energy storage device even more.

In an alternative variant, both the fuel cell stack and the energy storage device are periodically loaded with at least one electric load that is variable in terms of its power consumption, so that the fuel cell stack outputs a higher power in a first time interval than in a second time interval and the energy storage device outputs a lower power in the first time interval than in the second time interval. The fuel cell stack advantageously outputs a power of 0 kW in the second time interval, while the energy storage device outputs a power of 0 kW in the first time interval. By alternately shifting the power ratios, a faster heating-up process can be achieved both for the fuel cell stack and for the energy storage device, which in turn increases the ruggedness of the system as a whole and the availability of the vehicle.

The fuel cell system according to the invention can be connected in an electrically conductive manner to an intermediate circuit, which in turn can be connected in an electrically conductive manner to the electric motor via the inverter.

The electric motor is preferably designed as a traction motor. Depending on its power rating, the traction motor can convert a larger proportion of the output power of the fuel cell stack into power loss than an auxiliary drive. As an alternative, the electric motor is designed as an auxiliary drive, such as an air compressor, an anode recirculation fan or a water pump.

In a further development of the invention, the intermediate circuit can be connected in an electrically conductive manner to at least one further electric motor via at least one further inverter. For each further electric motor, one further inverter is preferably provided, and a further inverter is assigned to each further electric motor. In addition, the intermediate circuit can be connectable in an electrically conductive manner to further electric machines. A control unit is provided for selecting the at least one further inverter for the purpose of consuming a further quantity of the output power of the fuel cell system and for converting the consumed further quantity of the output power into power loss by impressing a suitable current into at least one winding of the at least one further electric motor which is to be energized. In this variant, the electric motor is preferably designed as a traction motor, and the at least one further electric motor is preferably designed as an auxiliary drive of the fuel cell system. As explained above, the traction motor is usually capable of converting a larger proportion of the output power of the fuel cell stack into power loss than an auxiliary drive. In a fuel cell vehicle, however, the number of auxiliary drives usually exceeds the number of built-in traction motors. It is therefore also advantageous if output power can be converted into power loss in the auxiliary drives as well.

In a further development of the invention, the energy storage device can be connected in an electrically conductive manner to the intermediate circuit via a first DC/DC converter, so that the voltage of the intermediate circuit can be controlled largely independently of the voltage level of the energy storage device.

The first DC/DC converter can preferably be operated bidirectionally, enabling current to flow both from the energy storage device into the intermediate circuit and from the intermediate circuit into the energy storage device. This may, for example, involve recuperation processes for recycling kinetic braking energy or a charging of the energy storage device by the fuel cell stack.

The first (bidirectionally operated) DC/DC converter is particularly preferably designed as a voltage reduction/step-up converter combination. The first DC/DC converter is advantageously capable of adjusting an intermediate circuit voltage to a very low value, in particular below 200 V, during a heating-up phase and/or a warm-up phase. As the fuel cell stack is directly coupled to the intermediate circuit in an electrically conductive manner, the setting of a low intermediate circuit voltage results in a low fuel cell stack voltage and therefore in poor efficiency and high direct heat conversion in the fuel cell stack. The higher the heat input, the lower the intermediate circuit voltage.

In an alternative variant, the DC/DC converter is located between the battery and the intermediate circuit. In addition, a second DC/DC converter, which is designed as a step-up converter or as a combination of voltage reduction and step-up converter, is provided between the intermediate circuit and the fuel cell stack. The second DC/DC converter is provided for adjusting the fuel cell stack voltage to as low a value as possible, preferably below 75 volts, during a heating-up phase and/or during a warm-up phase. With the alternative variant (with the second DC/DC converter), a much lower fuel cell stack voltage can be set than with the particularly preferred variant with only one (first) DC/DC converter, which is desirable during the heating-up phase and/or during the warm-up phase. The particularly preferred variant, however, offers the advantage of lower costs, because the second DC/DC converter is omitted.

BRIEF DESCRIPTION OF THE DRAWING FIGURES

Further advantageous variants and developments of the invention are explained below with reference to the figures, using the following embodiment as an example.

Of the figures:

FIG. 1 is a flow chart of a method according to the invention for cold-starting a fuel cell system;

FIG. 2 shows a torque/speed characteristic of a traction motor; and

DETAILED DESCRIPTION

Figure 3:
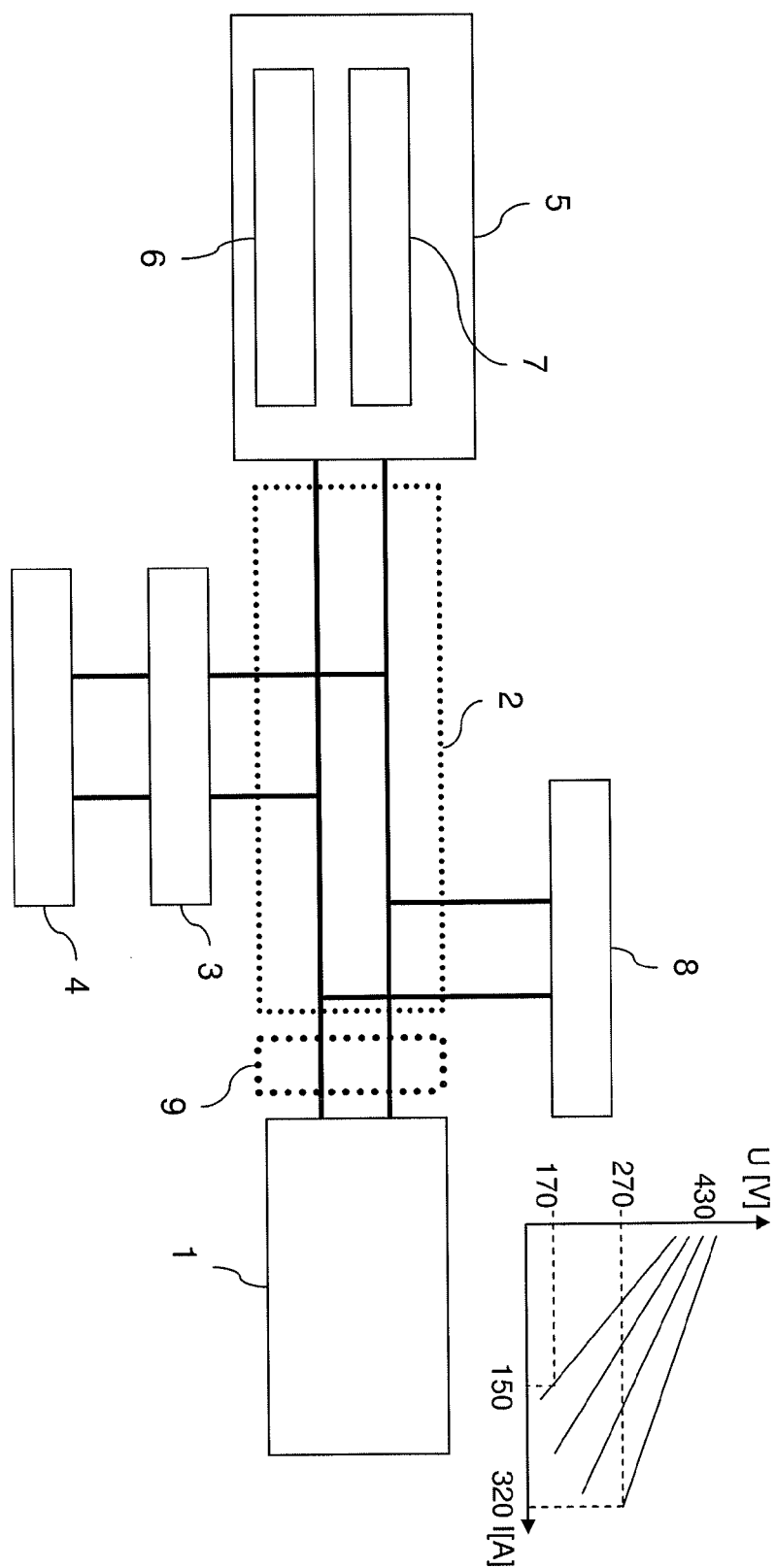
FIG. 3 is a block diagram of a drive train with a fuel cell system according to the invention.

The flow chart of FIG. 1 shows a first embodiment of a method according to the invention for cold-starting a fuel cell system for a fuel cell vehicle. In a first column, the procedure which can be called up is specified. A second column shows the operating phase associated with the respective procedure, and the third column contains a description. The preferred duration of each operating phase is indicated in the fourth column.

A cold start is in this context the start of a cold fuel cell vehicle at below operating temperature, wherein the temperature of a fuel cell stack 1 lies in particular below 0° C., for example at −25° C.

To ensure a sufficiently reliable, stable and repeatable cold start, a cold start procedure can be provided which includes at least three operating phases which follow one another sequentially.

In a first operating phase—hereinafter simply described as initialization phase—the fuel cell system is switched on and the media (hydrogen/oxygen) are metered.

The initialization phase is followed by the cold start process, to which the two remaining operating phases (a second and a third operating phase) of the cold start procedure are to be assigned.

In the second operating phase—hereinafter simply described as heating-up phase—the fuel cell stack 1 is to be operated at as low a voltage as possible, which means a relatively low efficiency and results in a high direct heat conversion in the fuel cell stack 1, whereby the heating-up phase is shortened considerably. The generated electric power is taken from the fuel cell stack 1 and supplied to electric loads 3, 4, 7, 8, which act as power sinks during the second operating state.

In this embodiment, the following power sinks are considered with the following restrictions:

1. An HV battery 4: The HV battery 4 can consume only little power at low temperatures and is therefore no longer available as a power sink after a short period of time.

2. Several auxiliary drives 8 of the fuel cell system (e.g. motors for air compressor and recirculation fan): The availability of the auxiliary drives 8 of the fuel cell system as power sinks is not unlimited, but determined by the current requirements of the operating state of the vehicle.

3. An HV auxiliary heater: The HV auxiliary heater is not capable of consuming any amount of power, and its availability is therefore subject to restrictions.

4. A 12 V electrical system with electric loads, such as an electric cab air heater: The power consumption of the electrical system is determined by the power demand of the loads assigned to the electrical system and by a state of charge of a low-voltage battery assigned to the electrical system. One of the electric loads of the electrical system may, for example, be an electric cab air heater which ensures that the windscreen can be defrosted. The electric cab air heater can be used as a power sink as well. This is, however, understandably switched off by the driver at suitable times.

The number of power sinks for the fuel cell stack is therefore limited, and the electric loads 3, 4, 7, 8 are, owing to the operating limits described above, not available as power sinks without restrictions. For this reason, at least one electric motor 6, 8 is controlled such that it can additionally convert power into power loss. The control of the electric motor 6, 8 can be based on the known principle of field orientation, which is briefly explained below. In this known principle, at least two phase currents have to be measured. In a star connection, the third phase current can be determined from the two measured phase currents. These three phase currents form a current space vector that is transformed into a Cartesian coordinate system, which is rotating with a rotor flux position (rotor-fixed reference system). For this purpose, the current rotor flux position has to be determined and expediently made available as an angle for the above transformation. In this way, two steady-state constant variables are obtained, these being a variable in the direction of flux and a variable orthogonal to the direction of flux. Each of these two variables can be controlled by means of a suitable controller, for example a PI controller. A flux-forming variable and a momentum-forming variable can be preset as set values. The flux-forming variable is a flux-forming current, while the momentum-forming variable is a momentum-forming current. The starting variables of the controllers are the variables of the voltage space vector. By reverse transformation using the rotor flux position angle, this can be transformed into a stator-fixed system for the control of an inverter.

In this known principle, the flux-forming variable is uncoupled from the momentum-forming variable. As a result, a flux-forming current can be controlled separately from a momentum-forming current. In the known principle, a control strategy is usually chosen in which the flux-forming current is minimized as far as possible for increased efficiency.

According to the invention, however, the flux-forming current is to be maximized in the heating-up phase and, if required, in a warm-up phase to be explained later, in order to consume a maximum quantity of an output power of the fuel cell system. The consumed quantity of the output power of the fuel cell system is fed to the electric motor to be converted not into torque, but into power loss. For this reason, the above-mentioned function is hereinafter referred to as power loss function. This function allows for a higher loading of the fuel cell stack 1, which can therefore be made operational more quickly. The power loss function is preferably used in the electric traction motor 6, is however not restricted thereto and can also be applied to other electric motors 6, 8 in the vehicle, such as the auxiliary drives 8 of the fuel cell system. For this purpose, the inverter of the respective auxiliary drive 8 has to be selected.

To illustrate the power loss function explained above, FIG. 2 shows a torque/speed characteristic of the traction motor 6, which is preferably designed as a permanent-field synchronous machine. The ordinate axis (y) visualizes the torque and the abscissa axis (x) visualizes the speed range of the traction machine. According to this characteristic, the electric traction motor 6 can in certain situations impress a current that makes virtually no contribution to torque generation into its windings by a controlled selection of the inverter.

For this purpose, a procedure may, for example, be provided which, if required, determines whether a quantity of the output power of the fuel cell system can be consumed by a power consumption means (inverter). If this is the case, it is determined which quantity of the output power of the fuel cell system can be consumed by the power consumption means and converted into power loss in the electric motor in the current operating state. In accordance with this value, the set value for the flux-forming current is raised and the inverter is selected to absorb the quantity of the output power and to convert is into power loss in at least one phase winding of the electric motor 6, 8. This means that the flux-forming current is adjusted to a higher value than that which is required for current load conditions.

By a controlled selection of the inverter, at least a part of the output power of the fuel cell system can therefore be consumed and converted into power loss. This power consumption does not generate any additional torque.

The availability of the power loss function is dependent at least on the speed or the torque of the traction motor 6. For a specific torque/speed combination, the power loss function can be activated 10 in the first quadrant (motor operation at positive torque and positive speed) of the torque/speed characteristic. In the active ranges 10, the flux-forming current can be increased accordingly. In the heating-up phase and/or in the warm-up phase, a higher flux-forming current is to be impressed into the active range 10 than that which is required for current load conditions. In other ranges 11, the power loss function is not activated. The degree of power consumption depends at least on temperature.

With further reference to FIG. 1, as the duration of the heating-up phase, in which the capacity of the fuel cell stack 1 rises, is increased, it is possible that the electric loads 3, 4, 6, 7, 8 may consume less electric energy than the fuel cell stack 1 can provide even if the power loss function is used, which would prolong the heating-up phase unnecessarily.

For this reason, the drive enable signal is in the third operating state—hereinafter referred to as warm-up phase—to be issued prematurely at a reduced available output power of the fuel cell system. The output power of the fuel cell system is defined as the electric power of the fuel cell stack 1 minus the power consumption of the electric secondary loads 7, 8 required for the operation of the fuel cell system and/or of the fuel cell vehicle. Electric secondary loads 7, 8 may, for example, be auxiliary drives 8 of the fuel cell system, HV auxiliary heaters, possibly at least one low-voltage DC/DC converter 7 as well as a low-voltage electrical system and low-voltage loads such as cab air heaters or vehicle lighting. Alternatively, the drive enable signal can be issued prematurely at a reduced available total output power of the fuel cell stack 1 and the energy storage device 4.

The drive enable signal is to be explicitly issued before half of the output power of the fuel cell stack 1 is available. As a result, the output power of the fuel cell stack 1 can early be used efficiently, because from the time if the drive enable signal it can be supplied to the traction motor 6 as electric drive power. The drive enable signal is issued particularly efficiently at an availability of approximately 20% of output power.

Compared to other electric loads 3, 4, 7, 8, the traction motor 6 is, if required, advantageously capable of consuming most power in the form of drive power in the electric drive train. This results in an additional heating of the fuel cell stack 1, which is desirable and effective in this operating state, because the inadequate consumption of the power sinks as described above can be rectified in a simple way. The output power of the fuel cell stack 1 can be used efficiently for propulsion, as it can eventually be converted into torque.

The third operating state is mainly dependent on a current power demand of the traction motor 6. The power demand in turn can be determined, for example, at least as a function of the position of the accelerator. The different power demands can, in a descending order, be divided into four different classes: high-load operation, normal operation, low-load operation and idle operation.

Depending on the power demand of the traction motor 6, a distinction between two modes (a first and a second mode) is made in the third operating state.

In the first mode—high-load or normal operation—the available output power should be demanded by the electric traction motor 6 as completely as possible and converted into torque.

If the output power is still not high enough to provide the desired drive power, it may be provided that additional electric energy is taken from the high-voltage battery 4, if the high-voltage battery 4 is operational and sufficiently charged, in order to feed the electric traction motor 6.

Alternatively, the power demand can, for example, be reduced by means of a suitable iteration method. The torque available in this mode is at least sufficient for an adequate driving operation.

The second mode is used if the power demand of the traction motor 6 falls below a defined value during a low-load or idle operation, i.e., if the fuel cell system provides a higher output power than the traction motor 6 can consume in the form of drive power.

The difference between available output power and the power demand of the traction motor 6 is hereinafter defined as available excess power. The available excess power is in the second mode to be supplied to the power sinks 3, 4, 7, 8 depending on availability. In addition, the electric motors 6, 8, i.e., the traction motor 6 and the auxiliary drives 8, are to utilize the power loss function described above. By impressing a suitable magnetization current into at least one of their windings, the electric motors 6, 8 can convert at least a part of the excess power into power loss.

In a further development of the invention, in the so-called drying procedure a temperature in the cooling circuit of the fuel cell stack 1 is increased and/or the input humidity of the supply gas at the fuel cell stack 1 is reduced, in order to dry the fuel cell stack 1 for a subsequent start, in particular on completion of the cold start procedure.

The method according to the invention, with its variants and further development, has already been explained with reference to FIGS. 1 and 2. The method is preferably used in a vehicle with a drive train as shown in FIG. 3. For this purpose, suitable control algorithms have to be implemented in at least one control unit, or existing control algorithms have to be updated.

The embodiment shown in FIG. 3 illustrates in the center a drive train of a motor vehicle with a fuel cell system according to the invention. On the right-hand side of FIG. 3, a temperature-dependent U/I family of characteristics of a fuel cell stack 1 is shown by way of example.

The fuel cell system according to the invention comprises the fuel cell stack 1, which provides a direct current for an electric intermediate circuit 2. A battery 4 can further be connected in an electrically conductive manner to the intermediate circuit 2 via a first bidirectional DC/DC converter 3. The first DC/DC converter 3 is designed as a step-up/voltage reduction converter. A drive motor unit 5 is further connected to the intermediate circuit 2. The drive motor unit 5 comprises an inverter not shown in the drawing, an electric traction motor 6 and a low-voltage DC/DC converter 7. The intermediate circuit 2 can be connected in an electrically conductive manner to the electric traction motor 6. This DC/DC converter 7 is connected to the intermediate circuit 2 and designed as a low-voltage DC/DC converter 7 for the support of the supply voltage of an electrical system with a rated voltage of preferably 14 V and a battery voltage of 12 V.

The inverter at the intermediate circuit 2 is designed as a 3-phase inverter and has three half-bridges that can be connected in an electrically conductive manner to the intermediate circuit 2 via a positive and a negative supply rail. Each half-bridge comprises two series-connectable switching elements that are preferably designed as power semiconductors, e.g. as IGBTs or MOSFETs. A free-wheeling diode can be provided parallel to each switching element but opposed to the respective direction of current flow. In addition, each half-bridge between two switching elements comprises an intermediate node, each intermediate node being connectable in an electrically conductive manner to a phase winding of the electric motor 6. The three phase windings are preferably star-connected. The voltage of the intermediate circuit 3 can, for example, be switched to the three phase windings with the aid of pulse width modulation.

The intermediate circuit 2 can further, at least intermittently, be connected in an electrically conductive manner to various auxiliary drives 8 via a bipolar line network. In this arrangement, the intermediate circuit 2 can be connected in an electrically conductive manner to a further electric motor for each auxiliary drive 8 via a further converter (inverter).

In order to convert a part of the output power into power loss during the heating-up phase and/or the warm-up phase, the switching elements of the inverter can be selected as appropriate. In this context, a suitable current can be impressed, at least intermittently, into one or more phase windings. Further components capable of consuming a part of the output power of the fuel cell system and of converting this into power loss can also be integrated into the inverter and/or the electric motor 6, 8.

The voltage level of the intermediate circuit 2 is preferably predetermined by the fuel cell system and can be controlled via the first DC/DC converter 3. Via the first DC/DC converter 3, the intermediate circuit-side voltage level can be adapted to be equivalent to the battery-side voltage level, preferably, however, deviating therefrom, being higher or lower. In order to provide a deviating voltage level, the first DC/DC converter 3 has a buck function (voltage reduction) and a boost function (voltage increase). To explain the buck and boost functions, the intermediate circuit-side voltage level is, with reference to the first DC/DC converter 3, defined as input voltage, while the battery-side voltage level is designed as output voltage. If the input voltage of the first DC/DC converter 3 is converted into a lower output voltage, the first DC/DC converter 3 acts as voltage reduction unit in the so-called buck function. If the input voltage is to be converted into a higher output voltage, the first DC/DC converter 3 operates as a step-up converter using the boost function. The control of the intermediate circuit voltage by means of the first DC/DC converter 3 is advantageous, because it can be operated in a bidirectional arrangement, so that current can be both supplied to and taken from the intermediate circuit 2. For this reason, the first DC/DC converter 3 has to be capable of operating in a four-quadrant mode and has to comprise the buck and boost functionality described above.

With such a DC/DC converter 3, the intermediate circuit-side voltage level can be decoupled from the battery-side voltage level, which is particularly important in the heating-up phase. During the heating-up phase and/or the warm-up phase, it is advantageous if the intermediate circuit voltage is adjusted to as low a level as possible. In this way, the fuel cell stack 1 can be operated with as low a voltage and as low an efficiency as possible, resulting in a high waste heat of the fuel cell stack 1. With respect to the intermediate circuit voltage, it may also be provided that a defined minimum voltage is set, below which the voltage level must not fall during the cold start process. At low temperatures below freezing point, for example, a minimum voltage of 180 V is required in order to provide an adequate pump power for the coolant pump (taking into account the viscosity of the coolant at low temperatures). In the illustrated embodiment, the voltage levels of the intermediate circuit 2 and the fuel cell stack 1 are identical, because the fuel cell stack 1 is directly connected to the intermediate circuit 2.

In an optional variant, a second DC/DC converter 9 is provided upstream of the fuel cell stack 1. The second DC/DC converter 9 is indicated in FIG. 1 by dotted lines. With the (second) DC/DC converter 9 arranged between the fuel cell stack 1 and the intermediate circuit 2, the voltage of the fuel cell stack 1 can be reduced below the voltage of the intermediate circuit 2, which is particularly advantageous during the heating-up phase and/or the warm-up phase. In the heating-up phase, the fuel cell stack 1 can therefore operate at a fuel cell stack voltage lower than in the first embodiment, preferably below 75 V, but it is nevertheless possible to provide a high intermediate circuit voltage of for example 400 V which is suitable for feeding the electric loads. In the optional variant, it is therefore possible to set the voltage of the fuel cell stack to a much lower value in a heating-up phase, which allows for a faster heating-up process than in the first embodiment.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMBERS

1 Fuel cell stack
2 Intermediate circuit
3 First DC/DC converter
4 Energy storage device
5 Drive motor unit
6 Electric traction motor
7 Low-voltage DC/DC converter
8 Auxiliary drives
9 Second DC/DC converter
10 Power loss function can be activated
11 Power loss function not active

The invention claimed is:
1. A method for cold-starting a fuel cell system of a motor vehicle at temperatures below freezing, the method comprising:
loading a fuel cell stack with at least one load during a heating-up phase;
issuing a drive enable signal in dependence on at least one influencing variable in a warm-up phase,
wherein a defined quantity of output power of the fuel cell system is consumed by a power consumption means in the heating-up phase or in the warm-up phase, and
the consumed quantity of the output power is converted into power loss by impressing a current into at least one winding of an electric motor which is to be energized by uncoupling a flux-forming current from a momentum-forming current, controlling the flux-forming current separately from the momentum-forming current, and by adjusting the flux-forming current to a higher value than that which is required for a current load condition, wherein the fuel cell stack and an energy storage device are periodically loaded with at least one load of variable power consumption so that the fuel cell stack outputs a higher power in a first time interval than in a second time interval, and wherein the energy storage device outputs a lower power in the first time interval than in the second time interval.

2. The method according to claim 1, wherein the power consumption means is an inverter.

3. The method according to claim 2, wherein the drive enable signal is issued in the warm-up phase in dependence on available output power of the fuel cell system or in dependence on available total output power of the fuel cell stack and the energy storage device.

4. The method according to claim 1, wherein the drive enable signal is issued in the warm-up phase at an availability of less than 50% of the output power of the fuel cell system, or the drive enable signal is issued in the warm-up phase at an availability of less than 50% of the total output power of the fuel cell stack and the energy storage device.

5. The method according to claim 4, wherein the drive enable signal is issued in the warm-up phase at an availability of 20% of the output power of the fuel cell system, or the drive enable signal is issued in the warm-up phase at an availability of 20% of the total output power of the fuel cell stack and the energy storage device.

6. The method according to claim 1, wherein following a cold start, a temperature in a cooling circuit of the fuel cell system is increased or an input humidity of a supply gas for the fuel cell stack is reduced.

7. The method according to claim 1, wherein the fuel cell stack outputs a power of 0 kW in the second time interval and the energy storage device outputs a power of 0 kW in the first time interval.

* * * * *